Feb. 6, 1951  L. B. COLLINS  2,540,655
PEANUT HARVESTER
Filed Sept. 4, 1947  5 Sheets-Sheet 1

INVENTOR.
Lewis B. Collins
BY Victor J. Evans & Co.
ATTORNEYS

Feb. 6, 1951 L. B. COLLINS 2,540,655
PEANUT HARVESTER
Filed Sept. 4, 1947 5 Sheets-Sheet 3

INVENTOR.
Lewis B. Collins
BY Victor J. Evans & Co.
ATTORNEYS

INVENTOR.
Lewis B. Collins
BY Victor J. Evans & Co.
ATTORNEYS

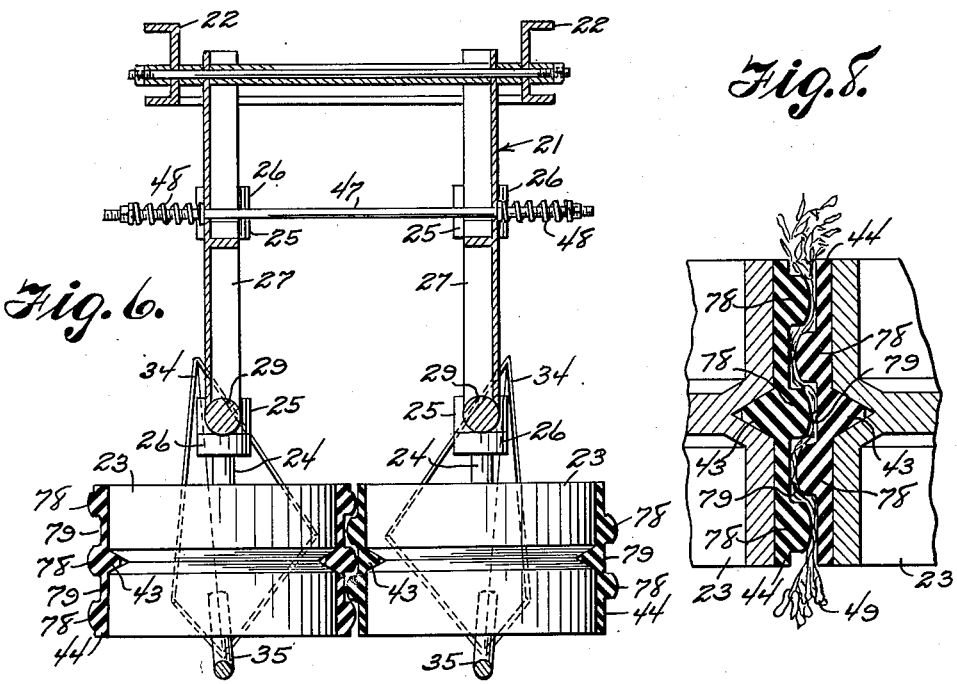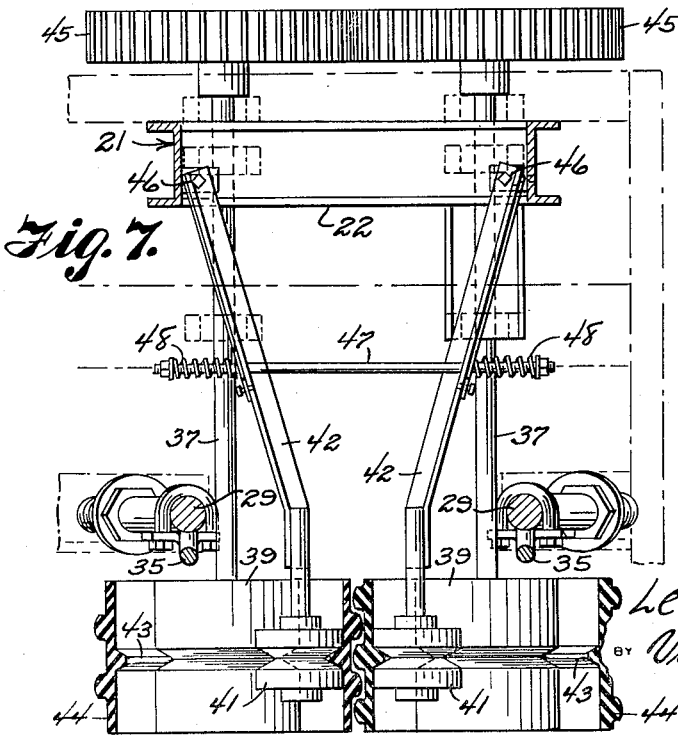

Patented Feb. 6, 1951

2,540,655

UNITED STATES PATENT OFFICE 2,540,655

PEANUT HARVESTER

Lewis B. Collins, Camilla, Ga.

Application September 4, 1947, Serial No. 772,101

7 Claims. (Cl. 55—66)

This invention relates to peanut harvesting machines.

It is an object of the present invention to provide a peanut harvesting machine which will pull the peanut plants by the root and convey them upwardly at a speed greater than the speed of the machine over the field and while being carried upwardly rotatable elements will engage the peanut roots to shake the dirt from the same and wherein at the end of the machine and at the end of the conveyors the plants will be dropped on a basket-like drop platform to be dropped when a sufficient quantity of the same have been collected.

It is another object of the invention to provide a conveyor formed of rubber belts disposed at opposite sides of the plant and which has interfitting projections on each of the belts whereby the peanut plant will be retained against vertical displacement so as not to be pulled from the conveyor when the elements are engaged to shake the dirt from the roots of the same and wherein the belt conveyor wheels are formed with grooves to receive projections on the inner face of the belts so that the belts themselves will be retained against downward displacement while being powered over the pulley wheels and wherein the conveyor belts are forced toward one another by spring tension means.

It is another object of the present invention to provide in a two row peanut harvesting machine means for effecting the adjustment of the conveying units to different row distances with minimum effort.

Other objects of the present invention are to provide a peanut harvesting machine which is of simple construction, inexpensive to manufacture and efficient in operation.

For other objects and for a better understanding of the invention, reference may be had to the following detailed description taken in connection with the accompanying drawing, in which Fig. 1 is a side elevational view of the peanut harvester with the parts set to effect a harvesting operation.

Fig. 6 is an enlarged transverse cross-sectional view of a conveying unit as viewed on line 6—6 of Fig. 5.

Fig. 7 is an enlarged transverse cross-sectional view of a conveying unit as viewed on line 7—7 of Fig. 5.

Fig. 8 is an enlarged cross-sectional view of the conveyor belts in engagement with one another and with a peanut plant disposed and retained therebetween.

Fig. 9 is a detail cross-sectional view taken on line 9—9 of Fig. 5 and of one of the gathering elements.

Figure 1:
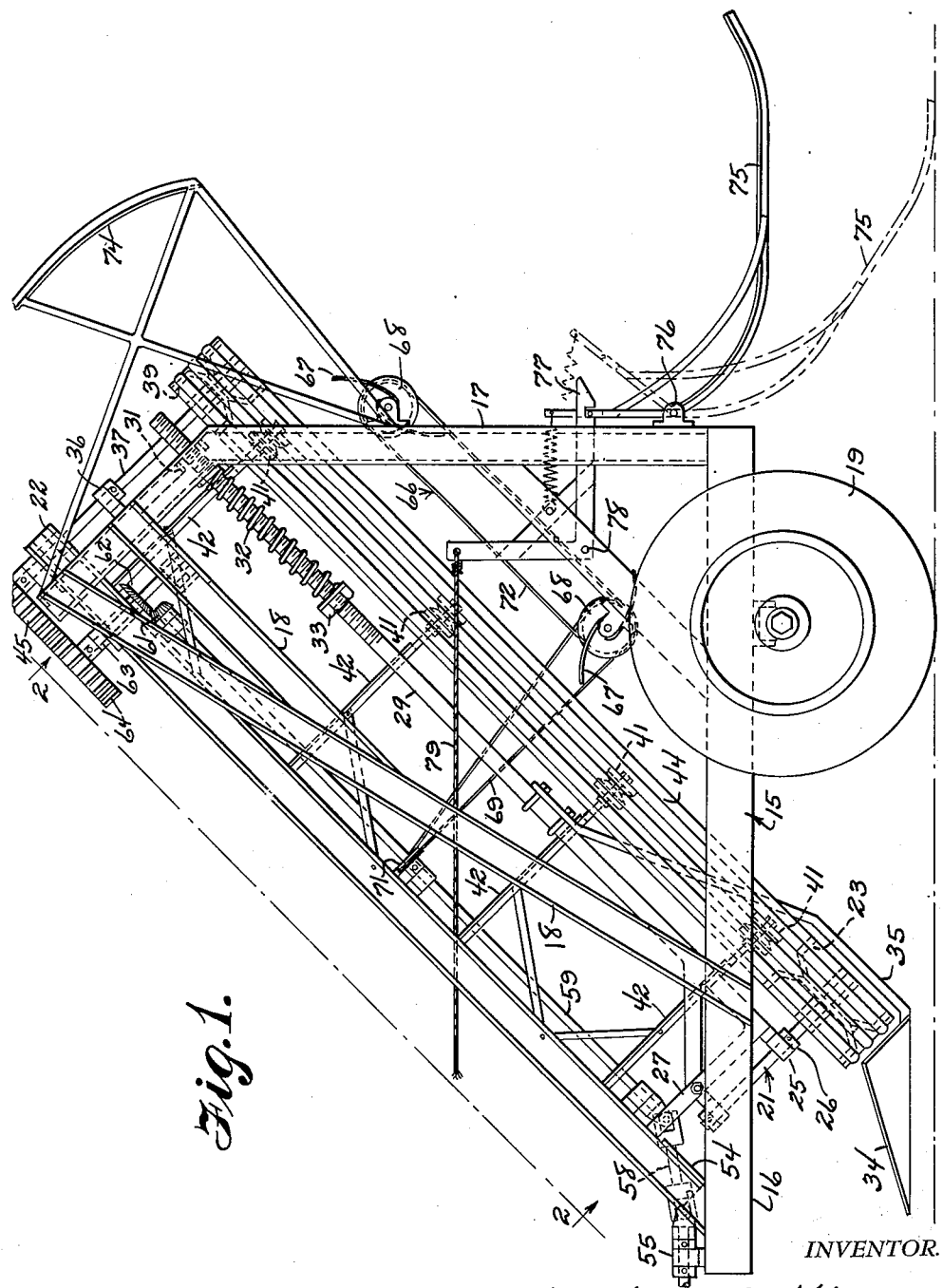
Figure 2:
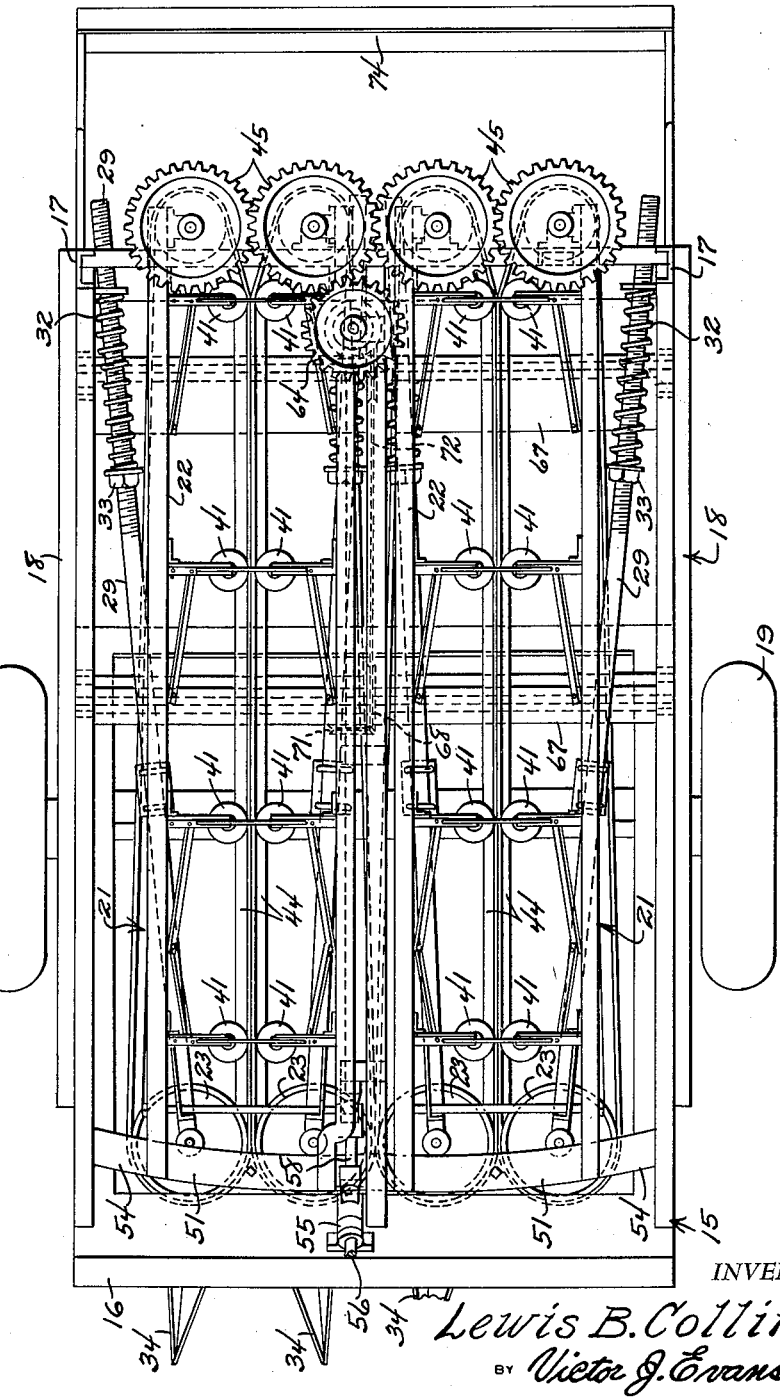
Fig. 2 is a top plan view of the peanut harvesting machine.
Figure 3:
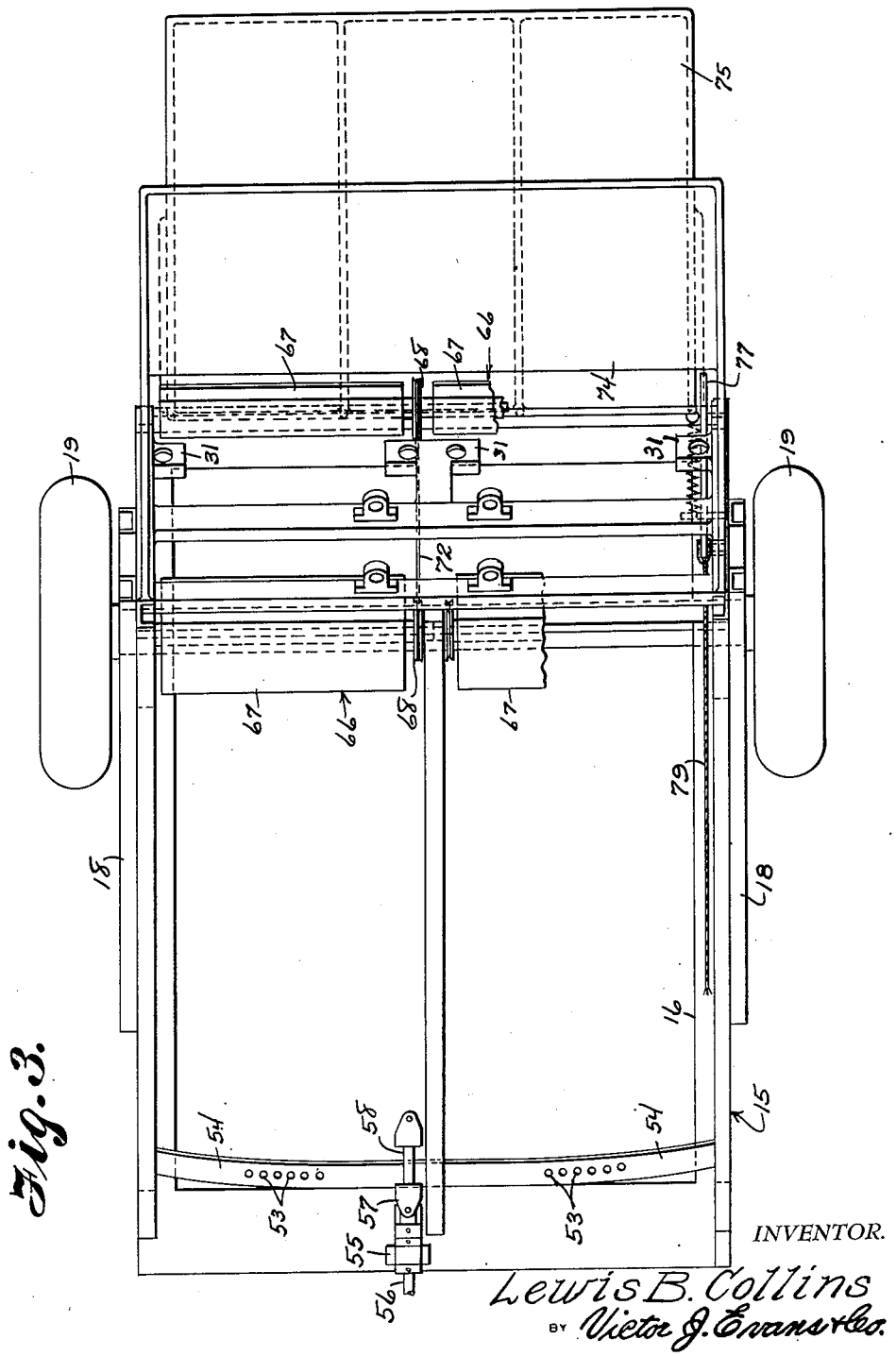
Fig. 3 is a top plan view of the frame with the conveyors removed from the same.
Figure 4:
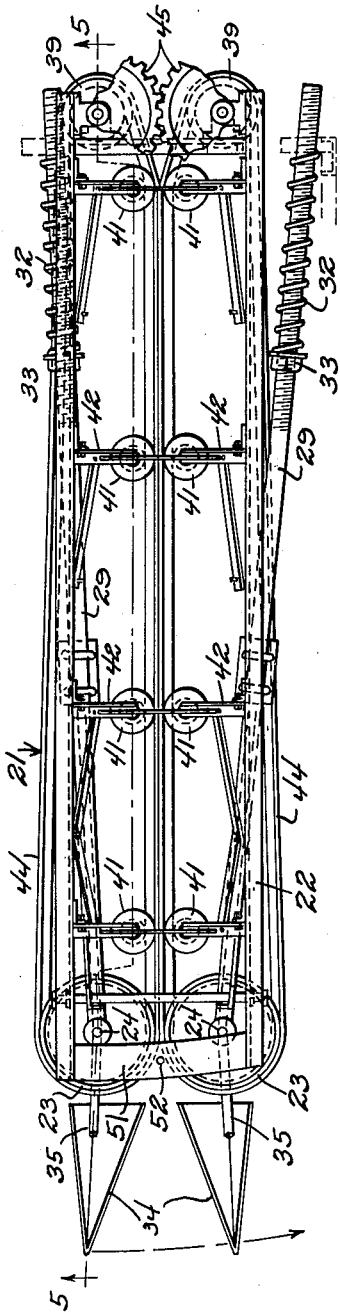
Fig. 4 is a top plan view of one of the conveying units.

Referring now to the figures, 15 represents a frame having a bottom portion 16 and a vertically extending upright portion 17 retained by braces 18. The vertically extending portion 17 is at the rear of the frame. The rear of the frame is supported on wheels 19.

Supported on the frame are two belt conveying units 21. These units are inclined from a forward position upwardly and rearwardly and are supported upon the top of the upright portion 17 of the frame.

These units 21 include frames 22, on the opposite ends of which are journalled pairs of conveyor belt wheels 23. These wheels are fixed to shafts 24 which are in turn journalled on projections 25 and retained against vertical displacement by collars 26.

Figure 5:
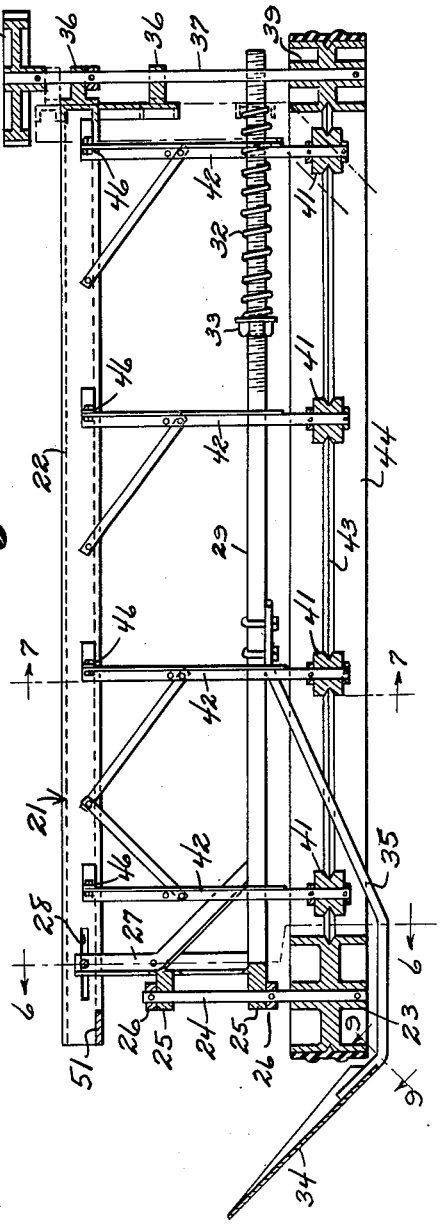
Fig. 5 is a longitudinal cross-sectional view of one of the units as viewed on line 5—5 of Fig. 4.

The projections 25 are extended from an adjustable member 27 slidable along the frame throughout a distance limited by the ends of a slot 28 in the upper part of the frame. A rod 29 extends rearwardly from the member 27, Fig. 5, and through a bracket 31 on the main frame so that a spring 32 surrounding the rod may react thereagainst to urge the member 27 forwardly so as to keep the belt wheel 23 extended. The spring tension 32 can be adjusted by turning nut 33 on the rod 29. Gathering elements 34 extend forwardly of the belt wheel 23 and are connected by extensions 35 with the rod 29 so that as the belt wheel 23 is adjusted forwardly the gathering elements 34 will likewise be adjusted. There are two gathering elements which are tapered to engage with the ground and draw the peanut stalks inwardly so as to direct them between the belt conveyors.

At the rear of the frame 22 there are projections 36 in which are journalled a shaft 37 having a belt driving wheel 39 thereon. On the frame and intermediate the wheels 23 and 39 are idler or guide pulleys or wheels 41 journalled on rods 42 depending from the frame. All of the wheels 23, 39 and 41 are grooved at their centers to receive an inwardly extending V-shaped projection 43 of belt 44. This V-shaped projection is of rubber and is preferably vulcanized onto the flat face of rubber belt 44. The driving shafts 37 have a gear 45 thereon. The gears 45 of each unit are meshed together to effect rotation of the conveyor belts in unison.

In Fig. 7, it will be noted that the depending shafts 42 are pivoted to the upper part of the frame as indicated at 46. A rod 47 extends between the shafts or members 42 and this rod has compression springs 48 on the opposite ends of the same adapted to be urged against the outer sides of the members 42 whereby to draw the members 42 toward one another and to bring the belts 44 into close coupled relationships as viewed also in Fig. 8 whereby to retain peanut plant 49.

The forward ends of the units 21 have a plate 51 with a hole 52 therein through which a screw is threaded for engagement with any one of several holes 53 of a curved transverse plate 54 connected to the forward part of the frame 15. There are a series of holes at each side of the plate 54. By adjusting the units over the plate 54 different width spacings of rows can be accommodated. The rear parts of the units 21 are secured to the upright portions 17 of the main frame 15. On the forward part of the frame 15 is a bearing bracket 55 which contains a shaft 56 with a universal joint 57 thereon for driving a coupling member 58 and a shaft 59 which extends substantially the full length of one of the units. This shaft has a pinion 61 thereon which drives a bevel gear 62 on the end of a shaft 63 having a large gear 64 thereon. The gear 64 is meshed with one of the gears 45 of one unit. The gears of each unit are coupled together and the one gear of one unit is coupled to the one gear of another unit so that all of the gears 45 of both units are in mesh with one another and are driven in synchronism. Two rows of peanuts are accordingly harvested at one time.

On the upright portion 17 and inclined beneath the conveyor belt is a device 66 for engaging the peanut roots whereby to knock off the dirt from the same. This device 66 includes rotary elements 67 having vanes thereon adapted to engage with the peanut roots as they are being carried upwardly on the conveyor. This element 67 is connected to a shaft which has pulley wheels 68. A belt 69 is connected to the shaft 59 as indicated at 71 and drives one wheel 68. The other wheel 68 is driven by a belt 72 connecting the two shafts together.

As the peanut plants are discharged from the upper end of the belt conveyors, they are thrown against a plate 74 and drop downwardly onto a basket-like platform 75 which is pivoted at 76 to the upright portion 17 of the main frame. This platform is normally retained in a raised position by a catch 77 pivoted to the frame at 78 and adapted to be operated by a pull cord 79 connected to a tractor which pulls the peanut harvester over the field. When the platform 75 is released, it will drop to a ground position indicated by the dotted lines in Fig. 1 and the contents thereof will be discharged upon the ground. Thereafter the platform 75 is lifted.

Referring now particularly to Fig. 8, it will be noted that the rubber belts 44 not only have portions secured to the rear face of the belt but also have projections on their inner faces whereby the projections of one belt will interlock with the projections of another belt whereby to crimp the bean plant as shown clearly in Fig. 8 and positively retain the plant against vertical displacement while the roots are shaken by the vane elements 67. On one of the belts there are three projections 78 while on the other belt there are two projections 78. These projections fit respectively into spaces as indicated at 79 in the opposite belt.

While various changes may be made in the detail construction, it shall be understood that such changes shall be within the spirit and scope of the present invention as defined by the appended claims.

I claim:

1. In a peanut harvester having a main frame, provided with means for supporting the main frame above the ground, the improvement comprising a gathering and conveying unit connected to the main frame and inclined upwardly and rearwardly from a forward location thereon, a device located below the conveyor for shaking the dirt from the roots while the same are retained by the conveyor and moving upwardly, and each of said gathering and conveying devices including belts opposing one another V-shaped formations on the rear of said belts, shafts pivotally mounted above said belts, pulleys rotatably mounted on the lower ends of the shafts adapted for engagement with the V-shaped formation on the belt, a rod loosely mounted in said shafts transversely thereof and springs on said rod outwardly of said shafts and engaging said shafts for maintaining pressure upon the inner sides of the belts through pressure of the pulleys thereon to retain the plants therebetween.

2. In a peanut harvester having a main frame, provided with means for supporting the main frame above the ground, the improvement comprising a gathering and conveying unit connected to the main frame and inclined upwardly and rearwardly from a forward location thereon, a device located below the conveyor for shaking the dirt from the roots while the same are retained by the conveyor and moving upwardly, and each of said gathering and conveying devices including belts opposing one another V-shaped formations on the rear of said belts, shafts pivotally mounted above said belts, pulleys rotatably mounted on the lower ends of the shaped formation on the belt, a rod loosely mounted in said shafts transversely thereof and springs on said rod outwardly of said shafts and engaging said shafts for maintaining pressure upon the inner sides of the belts through pressure of the pulleys thereon to retain the plants therebetween, and pulley wheels at the ends of the conveyor over which the belts are extended and the forwardmost pulley wheel connected to an independent frame, said gathering and conveying device including a main frame, the forwardmost pulley wheel frame being adjustably connected to the main frame, and spring tension means acting upon the pulley belt wheel frame to urge the pulley belt wheel forwardly to maintain the conveyor or pulley belt extended to the maximum extent.

3. The improvements as defined in claim 2 and gathering elements secured to and adjustable with the pulley wheel frame.

4. The improvements as defined in claim 1, and an arcuate shaped plate supported upon the frame and extending across the rear thereof in rear of the conveyor unit whereby to receive the peanut plants when they are discharged from the conveyor, a drop basket secured to the main frame and adapted to be pivoted downwardly and to catch the plants as they leave the conveyor after having been deflected by said plate spaced from the rear of the conveyor, and catch means for releasably securing the basket-like platform against pivotal movement.

5. A harvesting conveyor unit for harvesting machines comprising a frame adapted to be mounted upon the main frame of a harvesting machine, a pulley wheel located at one end of the frame and a second pulley wheel located at the opposite end of the frame, corresponding pulley wheels located at the opposite side of the frame, said pulley wheels having pulley belts adapted to run in the same direction to lift and raise row crops when gathered into the same, means for maintaining the conveyor belts in contact with one another whereby to prevent the downward displacement of the row crop confined between the same and said means comprising idler wheels located at opposite sides of the frame and engaging respectively with the inner faces of the respective conveyor belts, rod members suspended from the frame and pivoted to the upper portion thereof for transverse swinging movement and biasing means tending to urge the rods toward one another whereby to keep the conveyor belts in tight flush engagement with one another and with the row crop.

6. A harvester unit for row crop harvesting machines comprising a frame, pairs of pulley belts at the opposite ends of the frame, adjustable means on the frame for retaining one of the pulley belts, said adjustable means including a rod extending through the frame, spring means surrounding the rod and reacting against the same to normally extend the pulley belt wheel forwardly whereby to maintain a belt thereon tensioned, a conveyor belt extending about the pulley wheels, and means lying between the pulley wheels and engaging with the inner faces of the pulley belts for normally retaining the pulley belts toward one another at locations between the pulley wheels, said last means comprising spring pressed pulleys engaging the inner faces of the pulley belts and gear means for driving one of the pulley wheels to operate the belts.

7. A peanut harvesting machine including a gathering and conveying unit, said gathering and conveying unit including a frame, pairs of pulley wheels connected to opposite ends of the frame, means for connecting the forwardmost pulley wheels to the frame for adjustment relative thereto, said last means comprising a pair of rods extending through the frame, spring means surrounding each rod and reacting against the same to normally extend the pulley wheels forwardly of the frame and projections carried by the rods for connecting the pulley wheels to said rods, a pulley belt extended over the pulley wheels, one belt at each side of the frame, said pulley wheels having grooves in their center portions, said pulley belt having a continuous projection traveling in the groove whereby to retain the pulley belt against vertical displacement from the pulley wheel.

LEWIS B. COLLINS.

REFERENCES CITED

The following references are of record in the file of this patent:

UNITED STATES PATENTS

| Number | Name | Date |
| --- | --- | --- |
| 798,305 | Smith | Aug. 29, 1905 |
| 992,862 | De Young | May 23, 1911 |
| 1,148,058 | Spellman | July 27, 1915 |
| 1,251,425 | Rogers et al. | Dec. 25, 1917 |
| 1,928,868 | Poen | Oct. 3, 1933 |